United States Patent
Zhou et al.

(10) Patent No.: US 9,034,205 B2
(45) Date of Patent: May 19, 2015

(54) LUMINESCENT MATERIAL AND PREPARATION METHOD THEREOF

(75) Inventors: Mingjie Zhou, Guangdong (CN); Chaopu Shi, Guangdong (CN); Wenbo Ma, Guangdong (CN)

(73) Assignee: Ocean's King Lighting Science & Technology Co., Ltd., Guangdong (CN)

( * ) Notice: Subject to any disclaimer, the term of this patent is extended or adjusted under 35 U.S.C. 154(b) by 265 days.

(21) Appl. No.: 13/700,506

(22) PCT Filed: Jul. 19, 2010

(86) PCT No.: PCT/CN2010/075254
§ 371 (c)(1),
(2), (4) Date: Nov. 28, 2012

(87) PCT Pub. No.: WO2012/009845
PCT Pub. Date: Jan. 26, 2012

(65) Prior Publication Data
US 2013/0069004 A1 Mar. 21, 2013

(51) Int. Cl.
C09K 11/78 (2006.01)
C09K 11/55 (2006.01)
C09K 11/66 (2006.01)
C09K 11/77 (2006.01)
H01J 1/304 (2006.01)
H01J 31/12 (2006.01)
H05B 41/36 (2006.01)

(52) U.S. Cl.
CPC ............ *C09K 11/7793* (2013.01); *H01J 1/304* (2013.01); *H01J 31/127* (2013.01); *H05B 41/36* (2013.01); *C09K 11/7775* (2013.01)

(58) Field of Classification Search
USPC ............................ 252/301.4 F; 313/495, 496
See application file for complete search history.

(56) References Cited

FOREIGN PATENT DOCUMENTS

| CN | 101184824 A | 5/2008 |
|---|---|---|
| EP | 1 111 025 A2 | 6/2001 |
| EP | 1111025 | * 6/2001 |
| JP | 2005-298679 A | 10/2005 |

OTHER PUBLICATIONS

International Search Report for corresponding International Application No. PCT/CN2010/075254 mailed May 19, 2011.

* cited by examiner

*Primary Examiner* — Carol M Koslow
(74) *Attorney, Agent, or Firm* — Renner, Otto, Boisselle & Sklar, LLP

(57) ABSTRACT

The formula of a luminescent material is $NaY_{1-x}Ln_xGeO_4$, wherein Ln is lanthanon, and the value of x is $0<x\leq0.2$. The luminescent material adulterated with lanthanon constitutes germanate luminescent material comprising lanthanon, which improves efficiently the stability and luminescent performance of the luminescent material. The presence of lanthanon enables the luminescent material to emit light with different colors such as red, green, blue, etc. under the excitation of cathode rays, and be better used in a filed emission device. In the preparation method of the luminescent material, source components are mixed up and directly and sintered, and the luminescent material is acquired.

3 Claims, 2 Drawing Sheets

LUMINESCENT MATERIAL AND PREPARATION METHOD THEREOF

This application is a national phase of International Application No. PCT/CN2010/075254 filed Jul. 19, 2010.

TECHNICAL FIELD

The present invention belongs to the technical field of luminescent materials, and in particular relates to a luminescent material and a method for preparing the same.

BACKGROUND

Field emission display (FED) is a flat-panel display developed in recent years, and belongs to low-voltage cold cathode emission. This special emission characteristic endows FED with various superior properties which are different from those of the other flat-panel displays: low working voltage (200~5000V), low power consumption, high brightness, low thickness, small size, light weight, good stability, long service life, fast response speed, full color display, no visual angel limitation, and good compatibility with the environment.

One of the key factors in preparing field emission devices with superior properties is the preparation of high performance fluorescent powder. The fluorescent materials currently used in field emission devices are mainly sulfide series, oxide series and oxysulfide series fluorescent powders which are used in traditional cathode-ray tubes and projection TV picture tubes. Sulfide series and oxysulfide series fluorescent powders have relatively high luminescent brightness and certain electric conductivity, but are liable to decompose under the bombardment of large beam electron beam to release elemental sulfur which "poisons" the pinpoint of the cathode, and produce other deposits which cover the surface of the fluorescent powders, reduce the fluorescent efficiency of the fluorescent powders, and shorten the service life of the field emission devices. The oxide fluorescent powders have good stability, but their luminescent efficiency is not high enough, and the materials are normally insulators. The performances of both materials still need to be improved.

SUMMARY

In view of the above, the present invention provides a germanate luminescent material doped with rare earth elements, which has high electric conductivity, stability and luminescent efficiency.

In addition, it is provided a method for preparing a luminescent material which has a simple process and low cost.

The technical solutions for solving the above technical problems by the present invention are as follows.

A luminescent material, having a chemical formula of $NaY_{1-x}Ln_xGeO_4$, wherein Ln is selected from Eu, Tb, Tm, Sm, Dy and Bi, and x is in a range of $0<x\le0.2$.

Further, a method for preparing a luminescent material, comprising the steps of:
providing a source compound of Na, a source compound of Ln, a source compound of Y and a source compound of Ge according to stoichiometric ratio of elements in a chemical formula $NaY_{1-x}Ln_xGeO_4$, wherein Ln is selected from Eu, Tb, Tm, Sm, Dy and Bi, and x is in a range of $0<x\le0.2$;
mixing the source compound of Na, the source compound of Ln, the source compound of Y and the source compound of Ge, and milling them to a mixed powder; and
sintering the mixed powder, cooling to room temperature, and milling to give the luminescent material.

In the above luminescent material and the preparation method, the luminescent material is doped with rare earth element and sodium ions, constituting a germanate luminescent material comprising rare earth element, which effectively increases the stability and the luminescent performance of the luminescent material. In addition, the presence of sodium ions effectively increases the electric conductivity of the luminescent material. The presence of rare earth element enables the luminescent material to selectively emit lights with different colors, such as red, green, blue, etc. under the excitation of cathode rays. Accordingly, the luminescent material can be better used in field emission devices. In the method for preparing the luminescent material, the source components are mixed directly and sintered to give the luminescent material. According, the preparation process is simple with low cost, and has a broad application prospect.

DESCRIPTION OF THE FIGURES

The present invention will be further illustrated referring to the Figures and the embodiments, in which.

SPECIFIC EMBODIMENTS

In order to make the objectives, the technical solutions and the advantages of the present invention more obvious, the present invention will be further described in detail in combination with the Figures and the embodiments. It shall be understood that the specific embodiments described herein are only to illustrate rather than to limit the present invention.

The luminescent material of an embodiment of the present invention has a chemical formula of $NaY_{1-x}Ln_xGeO_4$, wherein Ln is selected from Eu, Tb, Tm, Sm, Dy and Bi, and x is in a range of $0<x\le0.2$.

The above Ln is preferably selected from Eu, Tb, Tm, Sm, Dy and Bi; and x is preferably in a range of $0.001\le x\le0.15$.

The above luminescent material is doped with a rare earth element, constituting a germanate luminescent material comprising rare earth element and sodium ions, which effectively improves the stability and the luminescent performance of the luminescent material. When the ratio of the elements in the luminescent material is suitably adjusted, e.g., the range of x in the chemical formula of $NaY_{1-x}Ln_xGeO_4$ of the luminescent material is preferably $0.001\le x\le0.15$, and Ln is preferably selected from Eu, Tb, Tm, Sm, Dy and Bi, the stability and the luminescent performance of the luminescent material may be further improved. In addition, the presence of sodium ions effectively increases the electric conductivity of the luminescent material. The presence of the rare earth element enables the luminescent material to emit lights with different colors, such as red, green, blue, etc. under the excitation of cathode rays. For example, the luminescent materials comprising rare earth elements such as Tm, Sm, and Dy, and Bi emit blue lights; the luminescent materials comprising rare earth elements such as Eu emit red lights; and the luminescent materials comprising rare earth elements such as Tb emits green lights, and they can be better used in field emission devices.

Figure 4:
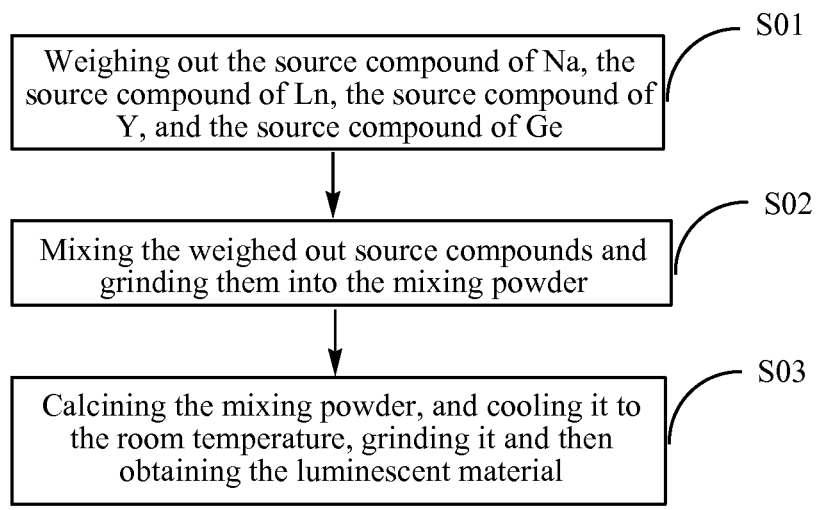
FIG. 4 is a flow chart of the method for preparing the luminescent material of the present invention.

In addition, the method for preparing the luminescent material of the present invention, as shown in FIG. 4, comprises the steps of: S1: providing a source compound of Na, a source compound of Ln, a source compound of Y and a source compound of Ge according to stoichiometric ratio of elements in a chemical formula $NaY_{1-x}Ln_xGeO_4$, wherein Ln is selected from Eu, Tb, Tm, Sm, Dy and Bi, and x is in a range of $0<x\leq0.2$; S2: mixing the source compound of Na, the source compound of Ln, the source compound of Y and the source compound of Ge, and milling them to a mixed powder; and S3: sintering the mixed powder, cooling to room temperature, and milling to give the luminescent material.

In step S1 of the above method for preparing the luminescent material, the source compound of Na is preferably at least one of sodium carbonates, sodium oxalate, sodium acetate, sodium fluoride, sodium chloride and sodium bromide; the source compound of Ln is preferably at least one of oxide, nitrate, carbonate, oxalate of Ln; the source compound of Y is preferably at least one of oxide, nitrate, carbonate, oxalate of Y; the source compound of Ge is preferably oxide of Ge.

In step S1 of the above method for preparing the luminescent material, the source compound of Ln is preferably selected from Eu, Tb, Tm, Sm, Dy and Bi; and x is preferably in the range of $0.001\leq x\leq0.15$.

In step S2 of the above method for preparing the luminescent material, it is preferred to mix the source compounds, and mill to make them to be mixed sufficiently and homogeneously. The milling may be ball milling or other milling mode commonly used in the art.

In step S3 of the above method for preparing the luminescent material, the sintering is conducted in the presence of an air atmosphere. The sintering temperature is preferably in the range of 900~1350° C., and the time is preferably in the range of 2~20 h; more preferably, the temperature is in the range of 1100~1300° C., and the time is 2~10 h. The luminescent material product of the present embodiment obtained after sintering may be further milled into a powder, and the milling may be ball milling or other milling mode commonly used in the art. To avoid destroying the molecular structure of the product, ball milling is preferred.

In the method for preparing the luminescent material, the source compounds are directly mixed and sintered to give the luminescent material. Therefore, the preparation process is simple with low cost, and has broad application prospect.

Luminescent materials with different compositions, the method for preparing the same, and the performance thereof are illustrated by the following Examples.

Example 1

$NaY_{0.999}Sm_{0.001}GeO_4$ Luminescent Material and Preparation Thereof 0.5145 g of sodium bromide (NaBr), 1.3732 g of yttrium nitrate $(Y(NO_3)_3)$, 0.0017 g of samarium nitrate $(Sm(NO_3)_3)$ and 0.5230 g of germanium dioxide $(GeO_2)$ were weighed into an agate mortar, milled to mix homogeneously, and charged into a corundum crucible. The corundum crucible was placed into a high temperature furnace, and heated to 900° C. in an air atmosphere. After maintaining the temperature to sinter for 20 hours, the furnace was cooled down to room temperature. The cooled product was milled to give $NaY_{0.999}Sm_{0.001}GeO_4$ blue light luminescent material. The $NaY_{0.999}Sm_{0.001}GeO_4$ luminescent material of the present Example emits blue light under the excitation of cathode rays.

Example 2

Figure 1:
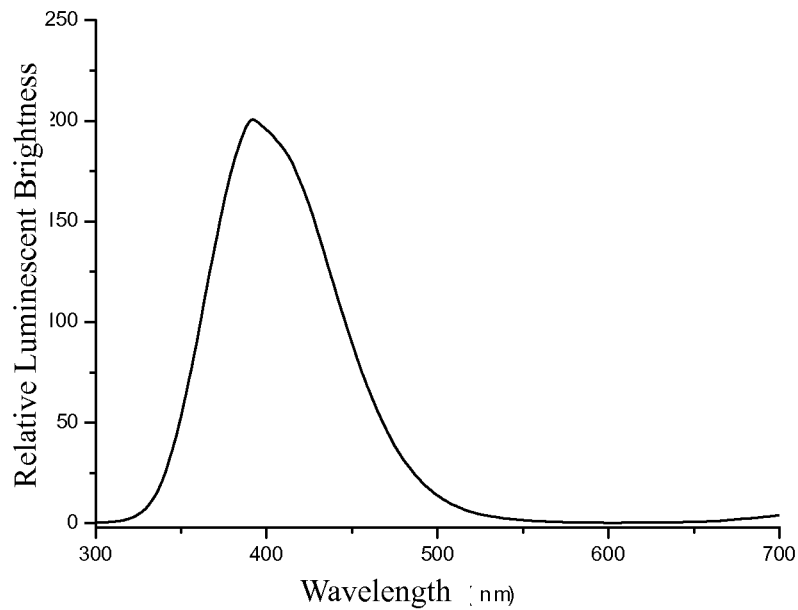
FIG. 1 is the luminescent spectrum of the luminescent material prepared in Example 2 of the present invention under the excitation of cathode rays having an accelerating voltage of 5 KV.

$NaY_{0.99}Bi_{0.01}GeO_4$ Luminescent Material 0.2100 g of sodium fluoride (NaF), 0.5589 g of yttrium oxide $(Y_2O_3)$, 0.0116 g of bismuth oxide $(Bi_2O_3)$ and 0.5230 g of germanium dioxide $(GeO_2)$ were weighed into an agate mortar, milled to mix homogeneously, and charged into a corundum crucible. The corundum crucible was placed into a high temperature furnace, and heated to 1200° C. in an air atmosphere. After maintaining the temperature to sinter for 5 hours, the furnace was cooled down to room temperature. The cooled product was milled to give $NaY_{0.99}Bi_{0.01}GeO_4$ luminescent material. The $NaY_{0.99}Bi_{0.01}GeO_4$ luminescent material of the present Example emits blue light under the excitation of cathode rays. The luminescent spectrum of the $NaY_{0.99}Bi_{0.01}GeO_4$ luminescent material prepared in the present Example under the excitation of cathode rays is shown in FIG. 1. The germanate luminescent material prepared in the present Example has a high luminescent efficiency and superior luminescent performance.

Example 3

$NaY_{0.8}Dy_{0.2}GeO_4$ Luminescent Material 0.2922 g sodium chloride (NaCl), 0.7156 g of yttrium carbonate $(Y_2(CO_3)_3)$, 0.2525 g of dysprosium carbonate $(Dy_2(CO_3)_3)$ and 0.5230 g of germanium dioxide $(GeO_2)$ were weighed into an agate mortar, milled to mix homogeneously, and charged into a corundum crucible. The corundum crucible was placed into a high temperature furnace, and heated to 1350° C. in an air atmosphere. After maintaining the temperature to sinter for 2 hours, the furnace was cooled down to room temperature. The cooled product was milled to give $NaY_{0.8}Dy_{0.2}GeO_4$ luminescent material. The $NaY_{0.8}Dy_{0.2}GeO_4$ luminescent material of the present Example emits blue light under the excitation of cathode rays.

Example 4

$NaY_{0.99}Tm_{0.01}GeO_4$ Blue Light Luminescent Material 0.335 g of sodium oxalate $(Na_2C_2O_4)$, 1.0936 g of yttrium oxalate $(Y_2(C_2O_4)_3)$, 0.0150 g of thulium oxalate $(Tm_2(C_2O_4)_3)$ and 0.5230 g of germanium dioxide $(GeO_2)$ were weighed into an agate mortar, milled to mix homogeneously, and charged into a corundum crucible. The corundum crucible was placed into a high temperature furnace, and heated to 1300° C. in an air atmosphere. After maintaining the temperature to sinter for 6 hours, the furnace was cooled down to room temperature. The cooled product was milled to give $NaY_{0.99}Tm_{0.01}GeO_4$ luminescent material. The $NaY_{0.99}Tm_{0.01}GeO_4$ luminescent material of the present Example emits blue light under the excitation of cathode rays.

Example 5

Figure 2:
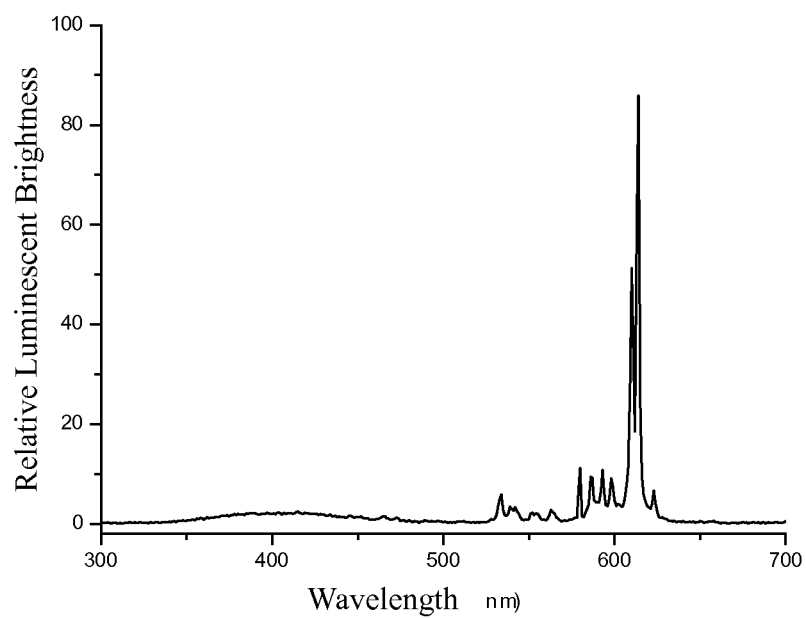
FIG. 2 is the luminescent spectrum of the luminescent material prepared in Example 5 of the present invention under the excitation of cathode rays having an accelerating voltage of 5 KV.

$NaY_{0.95}Eu_{0.05}GeO_4$ Luminescent Material 0.2650 g sodium carbonate $(Na_2CO_3)$, 0.5363 g of yttrium oxide $(Y_2O_3)$, 0.0440 g of europium oxide $(Eu_2O_3)$ and 0.5230 g of germanium dioxide ($GeO_2$) were weighed into an agate mortar, milled to mix homogeneously, and charged into a corundum crucible. The corundum crucible was placed into a high temperature furnace, and heated to 1200° C. in an air atmosphere. After maintaining the temperature to sinter for 5 hours, the furnace was cooled down to room temperature. The cooled product was milled to give $NaY_{0.95}Eu_{0.05}GeO_4$ red light luminescent material. The $NaY_{0.95}Eu_{0.05}GeO_4$ luminescent material of the present Example emits red light under the excitation of cathode rays. The luminescent spectrum of the $NaY_{0.95}Eu_{0.05}GeO_4$ red light luminescent material luminescent material prepared in the present Example under the excitation of cathode rays is shown in FIG. 2. The germanate luminescent material prepared in the present Example has a high luminescent efficiency and superior luminescent performance.

Example 6

Figure 3:
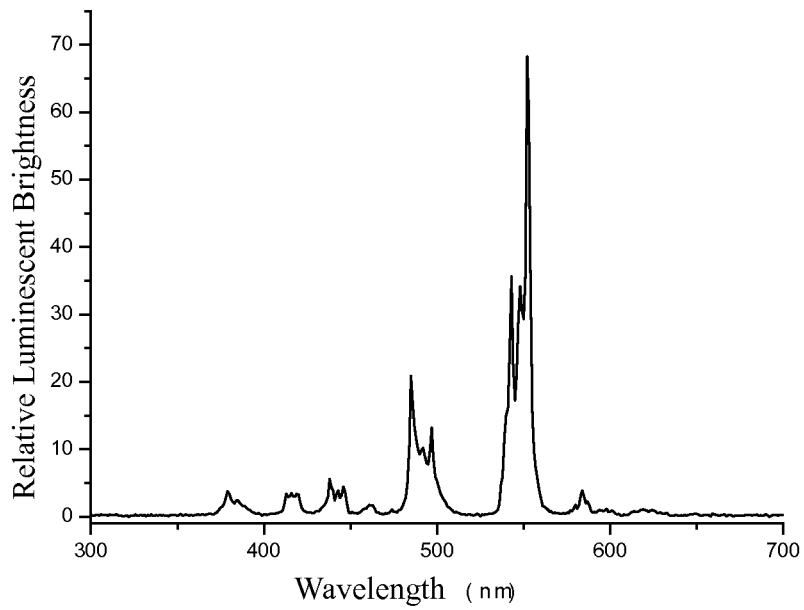
FIG. 3 is the luminescent spectrum of the luminescent material prepared in Example 6 of the present invention under the excitation of cathode rays having an accelerating voltage of 5 KV.

$NaY_{0.85}Tb_{0.15}GeO_4$ Luminescent Material 0.4101 g of sodium acetate ($CH_3CO_2Na$), 0.4798 g of yttrium oxide ($Y_2O_3$), 0.1402 g of terbium oxide ($Tb_4O_7$) and 0.5230 g of germanium dioxide ($GeO_2$) were weighed into an agate mortar, milled to mix homogeneously, and charged into a corundum crucible. The corundum crucible was placed into a high temperature furnace, and heated to 1100° C. in an air atmosphere. After maintaining the temperature to sinter for 10 hours, the furnace was cooled down to room temperature. The cooled product was milled to give $NaY_{0.85}Tb_{0.15}GeO_4$ luminescent material. The $NaY_{0.85}Tb_{0.15}GeO_4$ luminescent material of the present Example emits green light under the excitation of cathode rays. The luminescent spectrum of the $NaY_{0.85}Tb_{0.15}GeO_4$ green light luminescent material prepared in the present Example under the excitation of cathode rays is shown in FIG. 3. The germanate luminescent material prepared in the present Example has a high luminescent efficiency and superior luminescent performance.

Described above are only preferred embodiments of the present invention, which are not intended to limit the present invention. All modifications, equivalent substitutions and improvements within the spirit and principle of the present invention shall be within the scope of the present invention.

The invention claimed is:

1. A field emission device, which comprises a luminescent material, having a chemical formula of $NaY_{1-x}Ln_xGeO_4$, wherein Ln is selected from the group consisting of Eu, Tb, Tm, Sm, Dy and Bi, and x is in a range of $0 < x \le 0.2$.

2. The field emission device according to claim 1, wherein x is in a range of $0.001 \le x \le 0.15$.

3. The field emission device according to claim 1, wherein the luminescent material is selected from the group consisting of $NaY_{0.999}Sm_{0.001}GeO_4$, $NaY_{0.99}Bi_{0.01}GeO_4$, $NaY_{0.8}Dy_{0.2}GeO_4$, $NaY_{0.99}Tm_{0.01}GeO_4$, $NaY_{0.95}Eu_{0.05}GeO_4$ and $NaY_{0.85}Tb_{0.15}GeO_4$.

* * * * *